United States Patent [19]

Gebhart et al.

[11] 4,222,663
[45] Sep. 16, 1980

[54] OPTICAL PYROMETER AND TECHNIQUE FOR TEMPERATURE MEASUREMENT

[75] Inventors: John R. Gebhart, Enfield; Bruce E. Kinchen, Colchester, both of Conn.; Richard R. Strange, Jupiter, Fla.

[73] Assignee: United Technologies Corporation, Hartford, Conn.

[21] Appl. No.: 820,658

[22] Filed: Aug. 1, 1977

[51] Int. Cl.$^2$ .............................................. G01J 5/60
[52] U.S. Cl. .................................................... 356/45
[58] Field of Search ................................... 356/43, 45

[56] References Cited

U.S. PATENT DOCUMENTS

| | | | |
|---|---|---|---|
| 3,105,905 | 10/1963 | Loy | 356/45 |
| 3,795,918 | 3/1974 | Sunderland | 356/45 |

OTHER PUBLICATIONS

Pyrometer Temperature Measurements in the Presence of Reflected Radiation; Atkinson et al.; ASME Paper No. 76-HT-74; Aug. 9-11, 1976.

*Primary Examiner*—Vincent P. McGraw
*Attorney, Agent, or Firm*—Norman Friedland

[57] ABSTRACT

Apparatus for making temperature measurements where reflected energy has an adverse effect on the measured target temperature is disclosed. A pair of detectors see the same target but with the use of at least one filter so that the wavelength interval of one is contained within the other. From the output, calculations are made to correct for the errors due to the reflected energy.

7 Claims, 1 Drawing Figure

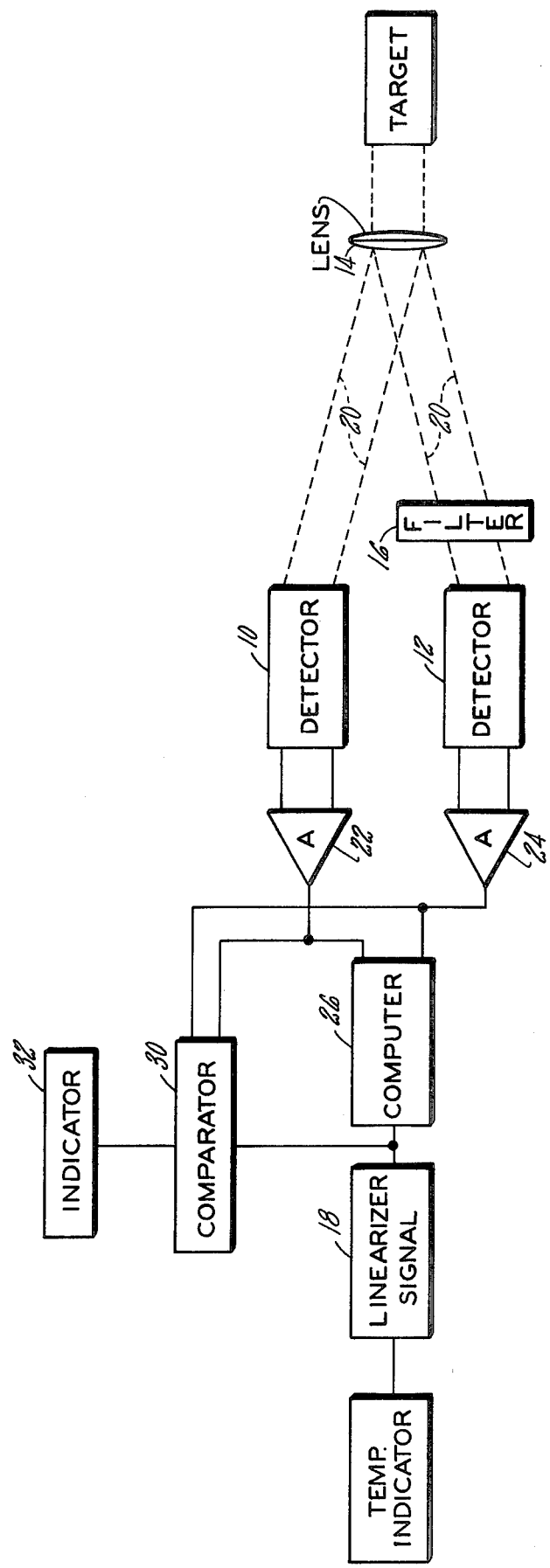

OPTICAL PYROMETER AND TECHNIQUE FOR TEMPERATURE MEASUREMENT

BACKGROUND OF THE INVENTION

This invention relates to optical pyrometers and the technique for making temperature measurements and particularly to utilizing two detectors having their wavelejgth interval such that kna is containad within the other.

This invention is particularly efficacious for use in temperature measurement of a turbine in a jet engine where the combustion flame produces reflected energy that adversely affects the measured temperature of the turbine. Optical pyrometers are well known measurement apparatus utilized in measuring temperature typically above the effective range of thermocouples or where a noncontact measurement is required. The heretofore known optical pyrometer typically employs one or two different wavelength intervals, however, in this system instead of a single color or the two color pyrometer, a split color technique is employed such that one wavelength interval is contained in the other.

Where in an environment as the jet engine, the combustion flame is hotter than the turbine surface, because the two pyrometers selected have different wavelength bands, each will be affected differently by the reflected energy. Hence, the spectral range of the two pyrometers are selected so that a reflected component is evidenced from the temperature differences. When both linearized pyrometer outputs are equal, no reflective error will be present. However, upon disagreement of the pyrometer, in accordance with this invention, these outputs can be utilized to calculate an approximation of the magnitude of the reflection error.

SUMMARY OF THE INVENTION

An object of this invention is an improved optical pyrometer temperature measurement apparatus and technique to calculate the error caused by the reflected energy received by the pyrometer.

A still further object of this invention is to provide an optical pyrometer system employing two identical detectors and at least one filter so that the wavelength band is such that one in one pyrometer is contained in the other pyrometer.

Other features and advantages will be apparent from the specification and claims and from the accompanying drawings which illustrate an embodiment of the invention.

BRIEF DESCRIPTION OF THE DRAWING

The sole FIGURE is a schematic illustration of the pyrometer system.

DESCRIPTION OF THE PREFERRED EMBODIMENT

Although this invention is particularly efficacious for measuring the temperature of a turbine in a gas turbine engine, it will be appreciated that the invention has utility for other applications, particularly where the reflected energy is a source of considerable error in the measured temperature of the target.

As shown in the sole FIGURE the split color pyrometer employs two detectors 10 and 12 mounted in parallel viewing a single target (such as a turbine wheel whose temperature is intended to be measured) viewed through lens 14. Each detector is identical and preferably is a silicon photodiode which is sensitive in the spectral range from 0.4 microns to 1.2 microns (This spectral range has negligible absorption or emission from the hot gases and products of combustion). Also, the silicon photodiode detector gives a stable output at ambient temperature eliminating the need for chopping the signal. The detectors are commercially available and are of the type that have a frequency response in excess of 100 kilohertz. This is particularly appropriate since it makes possible the thermal mapping of individual turbine blades while they are rotating.

Since the output is proportional to approximately the tenth power of the temperature in the range from 1200° to 2500° F., the pyrometer is fairly insensitive to changes in the emittance of the blades.

A commercially available optical filter 16 is mounted ahead of one diode, in this instance diode 12 to optically filter the energy incidental thereto and is selected to pass energy in the spectral range from 0.4 microns to 0.85 microns. Hence all radiation above 0.85 microns is blocked. As noted from the foregoing the spectral range of the filtered detector is contained within the range of the unfiltered detector.

The energy from lens 14 is transmitted to the detectors by a bifurcated fiber optic bundle or other means illustrated by the dash lines 20. By splitting the signal in this manner, it is assured that both pyrometers are looking at the same target.

Suitable preamplifier circuits 22 and 24 for each of the detectors which may be contained within a unitary housing containing each of the detectors permit the signals to be transmitted to the readout with a minimum of noise pickup. The readouts may have linearization circuitry 18 19 that convert the signals to a 1 millivolt per °F. format and provides a digital readout of the temperature.

Details of a suitable pyrometer apparatus embodying this invention is described in ASME Paper No. 76-HT-74 entitled "Pyrometer Temperature Measurements in the Presence of Reflected Radiation" by W. H. Atkinson and R. R. Strange, and is incorporated herein by reference.

The output from each signal amplifier is transmitted to computer 26 which may be analogue or digital but preferably analog because of the rapidly changing error for making correction for the reflected energy in the manner described hereinbelow. Inasmuch as the error term is rapidly changing, a high speed computer is necessary and hence the typical chopper cannot be used. The calculations account for the presence of reflected energy, which is considerable owing to the combustion flame, and approximates the magnitude of the reflected energy component. Compartor 30 compares the outputs of both amplifiers 19 and if identical, provides a signal to the indicator 32 which indicates that there is no reflective energy.

As is well known, the total energy detected by two pyrometers sensitive to different spectral ranges may be represented by the following formulas:

$$E_1 = E_{1b} + E_{1r}$$

$$E_2 = E_{2b} + E_{2r}$$

where:

$E_{1b}$, $E_{2b}$—is the energy sensed by the pyrometer that is emitted by the target as a result of its temperature, along each of the split light paths $E_{1r}$, $E_{2r}$—is the energy sensed by the pyrometer that originates from other sources and is reflected by the target into the pyrometer, along each of the split light paths From Planck's Law:

$$E_{1b} = \int_0^\infty \epsilon_b(\lambda)S_1(\lambda)P(t_b)d\lambda$$

$$E_{2b} = \int_0^\infty \epsilon_b(\lambda)S_2(\lambda)P(t_b)d\lambda$$

Where:
$\epsilon_b(\lambda)$ = Emittance of the target at wavelength $\lambda$
$S_i(\lambda)$ = Sensitivity of pyrometer i at wavelength $\lambda$
$\lambda$ = Wavelength in microns
$t_b$ = Target temperature in degrees Rankine
$P(t)$ = Monochromatic emissive power of a black body at temperature T in BTU/ft$^2$-hr micron $$P(t) = \frac{C_1 \lambda^{-5}}{e^{\left(\frac{C_2}{\lambda t_b}\right)} - 1}$$

$C_1 = 1.187 \times 10^8$ BTU micron $^4$/ft$^2$-hr
$C_2 = 2.5996 \times 10^4$ °R micron And $$E_{1r} = \sum_{j=1}^N \int_0^\infty ([1 - \epsilon_b(\lambda)]S_1(\lambda)R_j(\lambda) G_j(\lambda)P(t_j)d\lambda$$

$$E_{2r} = \sum_{j=1}^N \int_0^\infty ([1 - \epsilon_b(\lambda)]S_2(\lambda)R_j(\lambda) G_j(\lambda)P(t_j)d\lambda$$

Where:
$R_j(\lambda)$ = The emittance at wavelength $\lambda$ of the jth contributor to the reflection
$G_j(\lambda)$ = A term including all geometric considerations at wavelength $\lambda$ relating the jth component and the target surface being measured.

If we assume that there is only one source of reflected energy that is significantly hotter than the target surface, we can separate the term representing that source from the rest of the N−1 terms. If we separate out the single hotter source of reflected energy and combine the other N−1 reflection terms with $E_{1b}$ the energy equations become:

$$E'_{1b} = E_{1b} + \sum_{j=1}^{N-1} \text{reflection terms}$$

$$E'_{1b} = \int_0^\infty \epsilon_b(\lambda)S_1(\lambda)P(t_b)d\lambda +$$

$$\sum_{j=1}^{N-1} \int_0^\infty [1 - \epsilon_b(\lambda)]S_1(\lambda)R_j(\lambda)G_j(\lambda)P(t_j)d\lambda$$

$$E'_{2b} = \int_0^\infty \epsilon_b(\lambda)S_2(\lambda)P(t_b)d\lambda +$$

$$\sum_{j=1}^{N-1} \int_0^\infty [1 - \epsilon_b(\lambda)]S_2(\lambda)R_j(\lambda)G_j(\lambda)P(t_j)d\lambda$$

If we further assume that these N−1 reflection sources are at a temperature equal to the temperature of the target surface being measured, the effect is the same as enclosing the target in a black body cavity at temperature $t = t_b$. This assumption is appropriate for a turbine since the neighboring blades and vanes are at approximately the same temperature as the blade or vane surface being measured.

This yields:

$$E'_{1b} \approx \int_0^\infty S_1(\lambda)P(t_b)d\lambda$$

$$E'_{2b} \approx \int_0^\infty S_2(\lambda)P(t_b)d\lambda$$

The total energy incident on each pyrometer becomes:

$$E_{1t} = E'_{1b} + \int_0^\infty ([1 - \epsilon_b(\lambda)]S_1(\lambda)R_r(\lambda) G_r(\lambda)P(t_r)d\lambda$$

$$E_{2t} = E'_{2b} + \int_0^\infty ([1 - \epsilon_b(\lambda)]S_2(\lambda)R_r(\lambda) G_r(\lambda)P(t_r)d\lambda$$

Where the r subscript indicates the one source of reflected energy still to be considered.

We now make three further assumptions:
1. Over the spectral range of interest ($S_1(\lambda)$ or $S_2(\lambda) \neq 0$) we assume that the target is a gray body. That is, $\epsilon_b$ is not a function of $\lambda$.
2. Over the spectral range of interest we assume that the emittance of the source of reflected energy is of the nature of a graybody. That is, $R_r$ is not a function of $\lambda$.
3. Over the spectral range of interest we assume that none of the geometric effects vary with wavelength. That is, $G_r$ is not a function of $\lambda$.

These assumptions can be justified as long as the spectral range of each pyrometer is kept small. The energy equations then become:

$$E_{1t} = \int_0^\infty S_1(\lambda)P(t_b)d\lambda + (1 - \epsilon_b)R_r G_r \int_0^\infty S_1(\lambda)P(t_r)d\lambda$$

$$E_{2t} = \int_0^\infty S_2(\lambda)P(t_b)d\lambda + (1 - \epsilon_b)R_r G_r \int_0^\infty S_2(\lambda)P(t_r)d\lambda$$

But $(1 - \epsilon_b)R_r G_r$ is simply a constant, so let $C_r = (1 - \epsilon_b)R_r G_r$ $$E_{1t} = \int_0^\infty S_1(\lambda)P(t_b)d\lambda + C_r \int_0^\infty S_1(\lambda)P(t_r)d\lambda$$

-continued $$E_{2t} = \int_0^\infty S_2(\lambda)P(t_b)d\lambda + C_r \int_0^\infty S_2(\lambda)P(t_r)d\lambda$$

The values of $S_1(\lambda)$ and $S_2(\lambda)$ can be determined from the calibration of any optical filters used and from the knowledge of the spectral sensitivity of the detectors. The equations for $E_{1t}$ and $E_{2t}$, therefore, contain three unknowns: the temperature of the target ($t_b$), the temperature of the source of the reflected energy ($t_r$), and a constant term ($C_r$). In order to obtain a solution for the target temperature we must determine or assume a value for one of the two remaining unknowns.

$C_r$ = The constant term is an extremely complex term dependent on many unknown factors and would be very difficult to calculate.

$t_r$ = The temperature of the source can in many cases be measured or can be estimated from a knowledge of the source as in the case of a combustor flame in a turbine engine. (NOTE: When dealing with flames, the spectral response of the detectors must be chosen such that they do not include any of the flame line spectra. Otherwise the greybody assumption for the source of the reflection will be violated.)

With the knowledge of the temperature of the source of the reflection the equations for $E_{1t}$ and $E_{2t}$ can be solved.

The equations for $E_{1t}$ and $E_{2t}$ are transcendental in form so that for convenience their value can be solved by employing well known computer techniques. Such a technique is described in ASME Paper 76-HT-74, supra, which included estimated correction factors indicative of temperature for various amounts of reflection and a sample solution was detailed, and reference should be made thereto.

LIST OF SYMBOLS

E = Energy in BTU/ft$^2$-hr
$\epsilon_b(\lambda)$ = Emittance of the target at wavelength $\lambda$
$S_i(\lambda)$ = Sensitivity of pyrometer i at wavelength $\lambda$
$\lambda$ = Wavelength in microns
$t_b$ = target temperature in degrees Rankine
P(t) = Monochromatic emissive power of a black body at temperature t - in BTU/ft$^2$-hr micron
$C_1 = 1.187 \times 10^8$ BTU micron$^4$/ft$^2$-hr
$C_2 = 2.5896 \times 10^4$ R microns
$R_j(\lambda)$ = The emittance at wavelength $\lambda$ of the jth contributor to the reflection
$G_j(\lambda)$ = A term including all geometric considerations at wavelength $\lambda$ relating the jth component of the reflected energy and the target surface being measured.
tj = Temperature of the jth source of the reflected energy in degrees Rankine It should be understood that the invention is not limited to the particular embodiments shown and described herein, but that various changes and modifications may be made without departing from the spirit or scope of this novel concept as defined by the following claims.

We claim:

1. An optical pyrometer for measuring temperature of a remote target having a lens adapted to collect the energy emitted from the target, means including a fiber optic bundle for transmitting the collected energy picked-up by said lens, a pair of detectors sensitive to both the energy emitted from the target and reflected energy having identical spectral characteristics connected to said fiber optic bundle, a filter imposed between the lens and one of said detectors for limiting the spectral range passing therethrough such that the wavelength interval is contained within the band of the wavelengths sensed by the other detector, comparator means responsive to the output of said detectors for producing an indication whenever the temperature indicated by said two detectors are identical, high speed computer means also responsive to the output of said detectors for producing an output that compensates for the presence of reflected energy by estimating the magnitude of the reflected energy component.

2. Apparatus as in claim 1 wherein the computer means computes the values of the target temperature in accordance with the relationship $$\int_0^\infty S_i(\lambda)P(t_b)d\lambda + C_r \int_0^\infty S_i(\lambda)P(t_r)d\lambda$$

where $S_i$ is the sensitivity of the pyrometer i at wavelength $\lambda$.
$t_b$ is target temperature
P(t) is the monochromatic emissive power of a black body at temperature t
$C_r$ is a constant
$t_r$ is an estimate of the temperature of the source of reflected energy 3. Apparatus as in claim 2 wherein said detectors are silicon photodiodes.

4. Apparatus as in claim 3 wherein said silicon detectors are sensitive in the spectral range from 0.4 microns to 1.2 microns.

5. Apparatus as in claim 4 wherein said silicon detectors have a frequency response in excess of 100 kilohertz.

6. Apparatus as in claim 4 wherein said filter that passes energy in the spectral range from 0.4 microns to 0.85 microns.

7. Apparatus as in claim 6 including means for linearizing the output signal produced by said computer means.

* * * * *